June 8, 1954

O. A. HANSEN ET AL 2,680,582

CANOPY ATTACHMENT

Filed May 8, 1951

INVENTORS:
OTTO A. HANSEN
JAMES A. LAMPMAN

By Herbert E. Metcalf
THEIR PATENT ATTORNEY

Patented June 8, 1954

2,680,582

UNITED STATES PATENT OFFICE 2,680,582

CANOPY ATTACHMENT

Otto A. Hansen, Venice, and James A. Lampman, Inglewood, Calif., assignors to Northrop Aircraft, Inc., Hawthorne, Calif., a corporation of California Application May 8, 1951, Serial No. 225,168

5 Claims. (Cl. 244—121)

This invention relates to joints between plastic and metal, and more particularly to a means and method of attachment of astrodomes, pilot canopies, turret enclosures, or other transparent "bubbles" which protrude from the otherwise smooth contour of an airplane equipped with an internal air pressurization system.

With the advent of higher flying airplanes, constructions have been provided for sealing their cabins airtight and pumping air into them to keep the pressure within the cabin nearer to that of sea level atmospheric pressure than the air pressure at altitude. This is desirable for the physical comfort of passengers and crew, and because of the scarcity of oxygen for breathing in the more rarefied air. During the time the airplane cabin or cockpit is pressurized, the differential pressure between inside and outside air causes large forces to be pushing outwardly, and all airplane installations not directly a part of structural framework are subjected to a tendency to blow out. In addition, in high speed aircraft such as jet propelled fighters, high drag forces are present. For example, in several cases, astrodomes have blown off in flight, more than one of these accidents resulting in a person's death. It is, therefore, an object of this invention to provide a strong and reliable means and method of attaching astrodomes, bubble canopies, or the like, to the airplane, so that such parts may be relied upon to hold even under extremes of pressure, and under wide variations of temperature.

Previously, astrodomes, plastic enclosures and the like for installation in airplanes have been formed with a wide flange around the periphery, this flange being clamped or otherwise held between structural retainers forming part of the airframe. This method serves adequately for non-pressurized aircraft, but is not suitable under pressure conditions because of failures due to bending loads imposed at the points where the plastic material leaves the retainers.

Furthermore, in large plastic bubbles, such as canopies for covering tandem pilots, for example, the thermal expansion rate of the plastic enclosure may be much greater than that of the metal rim to which the plastic or canopy is attached. Therefore, the attachment means between the enclosure and the metal structure should be flexible not only from a bending standpoint but also in shear, so that excessive thermal rim stresses will not result from the extreme temperature variations to which the assembly is exposed.

In several instances canopies that are supposed to be quickly removable in flight to enable crew escape in an emergency have warped their attached rims to such an extent that removal is difficult, and in at least one instance, a pilot has been trapped in a high speed fighter plane after a high altitude flight for a period of several hours while the maintenance crew endeavored to remove a warped canopy of the quickly removable type.

The problem is therefore of a dual nature. First the plastic must be held to its metal rim in such a manner that a safe strong joint is made between plastic and metal, and second the attachment to a rim removably fastened to an airplane must be made in such a manner that distortion of the plastic will not distort the rim to such an extent that the desired quick separation is affected.

Briefly, our invention comprises forming an enlarged portion on the edge of the plastic enclosure to be attached to the airframe, and providing metallic edge retaining means around the enlarged edge portion so that forces tending to push the enclosure outwardly do not cause bending stresses in the enclosure material. The edge retaining means is in the form of a tapered locking channel around the enlarged edge portion, so that longitudinal expansion of the enclosure edge can occur in and along the retaining means.

In one embodiment of this invention, the metallic edge retaining means is not fastened directly to the airframe, but an intermediate flexible fabric member is provided, this fabric member being held at each side by positive tensioning means not relying on any cementing or adhesive procedures. Thus, an extra amount of lateral flexibility is obtained to allow more lateral expansion and contraction of the plastic enclosure.

The present invention may be more fully understood by reference to the ensuing detailed description of particular embodiments thereof, and to the accompanying drawings shown for example only.

Figure 1:
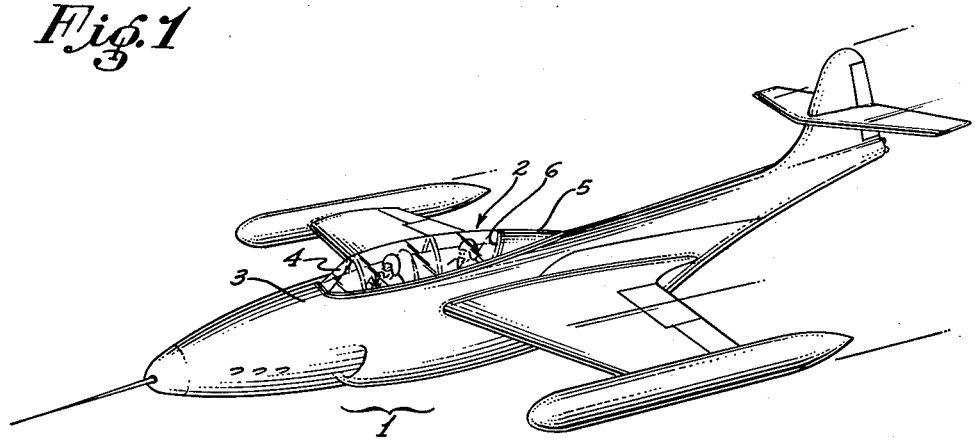
Figure 1 is a perspective flight view of a high speed airplane having a transparent plastic cockpit canopy which must withstand internal pressurization.

Referring first to Figure 1, a high speed, high altitude airplane 1 is provided with a removable enclosure canopy 2 covering two crew stations in a fuselage 3. The canopy extends aft from a fixed windshield 4, and includes a rear fairing 5 of streamlined shape. The main body of the canopy 2, forward of a rear bulkhead 6, is composed of an acrylic material commonly used for transparent "bubble" enclosures, astrodomes, and the like, such as Plexiglas, for example.

Figure 2:
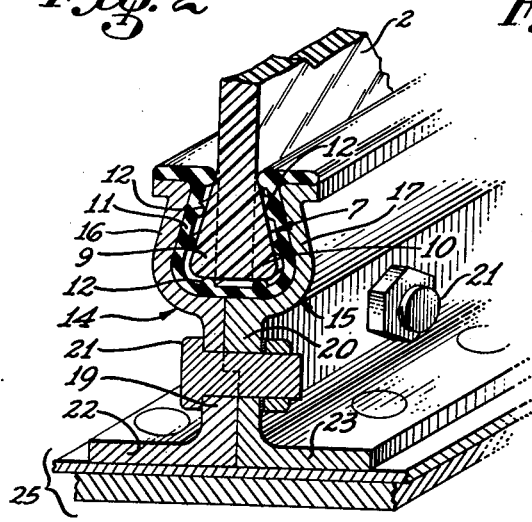
Figure 2 is an oblique projection of a cross section of one lower edge of the cockpit canopy, showing its attachment to the cockpit structure.

As shown in Figure 2, the lower edge along the side of the canopy 2 thickens out to form an enlarged portion 7. This enlarged portion 7 is preferably made by starting with the normal parallel-sided edge of the canopy (indicated by the dotted lines in Figures 2 and 3) and two wedge-shaped side strips 9 and 10 of the same acrylic material as the canopy 2. The parts are then bonded together by coating the contact surfaces with an acrylic monomer, preferably benzoin catalized prebodied methyl methacrylate monomer, placing the parts together, and then polymerizing the combination by the use of ultra violet light. The resulting bond renders the enlarged portion 7 a solid unit of homogeneous composition equally as strong as if the sheet and enlarged portion were shaped from an original solid block.

An extruded rubber sealing strip 11 is fitted around the enlarged portion 7 to extend to the parallel faces of the canopy 2. Raised ridges 12 may be provided along the inside of the rubber strip 11 to provide an air-tight seal while allowing lateral movement of the canopy 2 relative to the rubber strip 11.

Two half-brackets 14 and 15, consisting of aluminum alloy extrusions, for example, are placed around the rubber strip 11, the half-brackets having spaced legs 16 and 17 converging toward the top, and mating webs 19 and 20 at the bottom directly below the enlarged edge portion 7. The webs 19 and 20 are secured together by bolts 21, for example, along the length of the edge, so that the half-brackets 14 and 15 thus form a retaining channel from which the canopy 2 cannot be pulled. Flanges 22 and 23 on the half-brackets 14 and 15 are secured to a canopy rim structure 25 which is adapted to be removably attached in any desired manner to the fuselage 3 adjacent the cockpit.

It is thus seen that, when the cockpit is pressurized and this pressure tends to force the canopy 2 upwardly from its attachment, only tensile and compressive stresses are imposed on the canopy edges, and there is no tendency under these conditions for the canopy to experience a bending failure. Temperature variations which will cause the canopy 2 to expand and contract more than the metal rim 25 are allowed for by the fact that the canopy edge can move lengthwise in the retainers and can move laterally a substantial amount by deforming the ridges 12 on the rubber strip 11. Sealing qualities increase as the internal pressure increases, since the sealing strip 11 is thereby compressed tighter.

Figure 3:
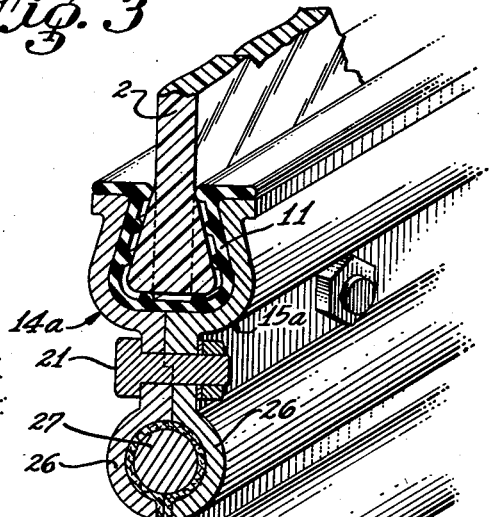
Figure 3 is a view similar to Figure 2, showing additional flexible attachment means between the canopy and the cockpit.
Figure 4:
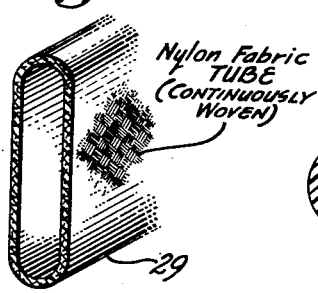
Figure 4 is an oblique view of a nylon tube before its installation in the construction of Figure 3.

To provide more lateral flexibility of the canopy without straining the metal framework, the construction of Figure 3 may be incorporated. Here, the retention of the edge of the canopy 2 is the same, but the half-brackets 14a and 15a have nearly semicircular upper clamps 26 at their lower edges instead of the flanges 22 and 23. A first metal rod 27 is inserted through the upper part of a fabric tube 29, and the two latter members are held firmly in the upper clamps 26 when the half-brackets 14a and 15a are bolted together, with the lower part of the fabric tube 29 projecting from the open space at the clamp lower ends. The fabric tube 29 is preferably comprised of a continuously woven nylon fabric, as shown also in Figure 4.

The lower part of the fabric tube 29 carries a second metal rod 30 like the first, and a pair of lower clamps 31, also extruded, secures the fabric tube 29 and the second rod 30 therebetween. This leaves a length of unconfined double fabric between the upper and lower clamps 26 and 31. The lower clamps 31 are arranged, with flanges 22a and 23a, for example, in a suitable manner to be attached to the canopy rim 25 similar to the half-bracket flanges 22 and 23 of Figure 2.

It is thus seen that the nylon fabric 29 is placed in tension when the airplane 1 is operating with a pressurized cockpit, and a much greater lateral flexibility of the canopy edges is provided. The continuous fabric tube arrangement is much stronger and more reliable than the known method where the ends of nylon or other fabric strips are cemented to the inside and outside of the canopy edge, since in the latter case the fabric strips are suscepted to a peeling action when lateral displacement occurs, and therefore the cemented strips tend to tear loose with normal use.

Figure 5:
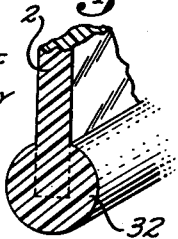
Figure 5 is an oblique view showing a different canopy edge shape from that illustrated in Figures 2 and 3.

Various shapes and sizes of the enlarged edge portion 7 can be successfully used. As shown in Figure 5, a beaded edge 32 may be formed by machining a groove in an acrylic rod and bonding the edge of the plastic canopy 2 into the groove by the method described previously. It is obvious that other edge shapes are also embraced by the present invention.

This invention is intended for use, for example in a structural combination where the canopy edge intersects the plane of the attachment to the surrounding structure substantially at a right angle. The points of intersection of the canopy edge with the surrounding structure may not all lie in a true plane, but it is preferred from an overall standpoint of enclosure design that at least two opposite edge portions have coplanar edge lines, and that these edge portions meet this indicated plane substantially perpendicularly. In this manner, no blow-out forces originating from internal pressure can result in placing the plastic material of the canopy 2 under a bending load. Since uneven temperature reactions of the plastic canopy and metal framework are allowable without deforming the metal attachment means, as discussed before, the canopy will thus remain substantially in tension alone, even under those conditions of temperature variation.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is therefore claimed in any of its forms or modifications within the legitimate and valid scope of the appended claims.

What is claimed is:

1. Means for attaching the edge of a plastic canopy or the like to a metal rim, which comprises an enlarged bead-like portion along said edge, said enlarged portion being an integral part of said edge, edge clamping means surrounding and contacting said enlarged portion on three sides thereof, and connecting means between said edge clamping means and said metal rim, said connecting means comprising a first gripping means extending from said edge clamping means and having a narrow opening in the outside thereof substantially in line with said canopy edge, a flexible fabric tube, a first rod-like member inserted through said tube against one side thereof, said first gripping means enclosing said first rod member and said one tube side, with the other side of said tube extending through said narrow opening, a second rod member inserted through said tube opposite from said first rod member, and a second gripping means having a similar narrow opening therein, said second gripping means enclosing said second rod member and said other tube side, with said one tube side extending from said similar narrow opening, the width of said narrow openings being substantially equal to twice the wall thickness of said fabric tube, and said second gripping means attached rigidly to said metal rim.

2. In an airplane having a transparent closure installation, the combination of a curved plastic enclosure having an enlarged bead-like portion along the edge thereof, said enlarged portion being an integral part of said edge and being symmetrically fixed with respect to the center line of said edge, edge clamping means surrounding and contacting said enlarged portion on three sides thereof, a metal rim adapted to be fitted to said airplane, and connecting means between said edge clamping means and said metal rim, said connecting means comprising a first gripping means extending from said edge clamping means and having a narrow opening in the outside thereof substantially in line with said canopy edge, a flexible fabric tube, a first rod-like member inserted through said tube against one side thereof, said first gripping means enclosing said first rod member and said one tube side, with the other side of said tube extending through said narrow opening, a second rod member inserted through said tube opposite from said first rod member, and a second gripping means having a similar narrow opening therein, said second gripping means enclosing said second rod member and said other tube side, with said one tube side extending from said similar narrow opening, the width of said narrow openings being substantially equal to twice the wall thickness of said fabric tube, and said second gripping means attached rigidly to said metal rim.

3. Apparatus in accordance with claim 2 wherein said fabric tube is comprised of continuously woven nylon.

4. Means for attaching the edge of a plastic canopy or the like to a metal rim, which comprises an integral enlarged bead-like portion of said canopy along said edge, a pair of formed longitudinal members adapted to be securely fastened together along mutual center lines, the facing edges of said members separating from each other outwardly from said center lines and then converging to form two opposite retaining channels having oppositely directed groove openings, the first of said retaining channels enclosing said enlarged canopy edge portion on three sides thereof, an elastic member positioned between said enlarged portion and said first retaining channel, a flexible fabric tube, a first rod-like member inserted through said tube against one side thereof, the second of said retaining channels enclosing said first rod member and said one tube side, with the other side of said tube extending through the groove opening of said second retaining channel, a second rod member inserted through said tube opposite from said first rod member, and means defining a third, separate, longitudinal retaining channel also having a groove opening therein, said third retaining channel enclosing said second rod member and said other tube side, the groove openings of said second and third retaining channels being substantially equal to twice the wall thickness of said fabric tube, and said third retaining channel attached rigidly to said metal rim, whereby lateral expansion of said canopy edge and said pair of formed members relative to said third retaining channel is provided by the portion of said fabric tube between said second and third retaining channels.

5. Apparatus in accordance with claim 4 wherein said fabric tube is comprised of continuously woven nylon, and wherein said elastic member has integral longitudinal ridges thereon pressed against said enlarged portion to render said attaching means airtight and to provide substantial longitudinal expansion of said canopy edge relative to said retaining channels.

References Cited in the file of this patent

UNITED STATES PATENTS

| Number | Name | Date |
|---|---|---|
| 2,091,615 | Röhm et al. | Aug. 31, 1937 |
| 2,095,944 | Bauer et al. | Oct. 12, 1937 |
| 2,210,652 | Dennett | Aug. 6, 1940 |
| 2,367,035 | McConnell et al. | Jan. 9, 1945 |
| 2,469,436 | King | May 10, 1949 |
| 2,602,198 | Parker | July 8, 1952 |
| 2,612,333 | Wood | Sept. 30, 1952 |